United States Patent [19]

Erdman et al.

[11] Patent Number: 5,394,497
[45] Date of Patent: Feb. 28, 1995

[54] CAPTIVATED FIBER OPTIC CONNECTOR

[75] Inventors: David D. Erdman, Hummelstown; Kevin T. Monroe, Harrisburg; Bryan T. Edwards, Camp Hill; Joseph L. McKee, Elizabethtown, all of Pa.

[73] Assignee: The Whitaker Corporation, Wilmington, Del.

[21] Appl. No.: 200,085

[22] Filed: Feb. 22, 1994

[51] Int. Cl.$^6$ .............................................. G02B 6/36
[52] U.S. Cl. .................................. 385/78; 385/60; 385/72; 385/76
[58] Field of Search ................... 385/78, 60, 72, 85, 385/76, 53, 56, 58, 66, 70, 69, 86

[56] References Cited

U.S. PATENT DOCUMENTS

| | | | |
|---|---|---|---|
| 4,579,418 | 4/1986 | Parchet et al. | 385/78 X |
| 4,762,389 | 8/1988 | Kaihara | 350/96.21 |
| 4,872,736 | 10/1989 | Myers et al. | 350/96.20 |
| 4,895,425 | 1/1990 | Iwano et al. | 350/96.20 |
| 5,018,316 | 5/1991 | Mulholland et al. | 51/216 R |
| 5,042,891 | 8/1991 | Mulholland et al. | 385/93 |
| 5,073,042 | 12/1991 | Mulholland et al. | 385/69 |
| 5,134,677 | 7/1992 | Leung et al. | 385/84 |
| 5,136,672 | 8/1992 | Mulholland et al. | 385/53 |
| 5,159,652 | 10/1992 | D'Alphonse et al. | 385/56 |
| 5,212,752 | 5/1993 | Stephenson et al. | 385/78 |
| 5,214,732 | 5/1993 | Beard et al. | 385/78 |
| 5,222,169 | 6/1993 | Chang et al. | 385/87 |
| 5,259,052 | 11/1993 | Briggs et al. | 385/78 |
| 5,287,425 | 2/1994 | Chang | 385/81 |

OTHER PUBLICATIONS

Brochure: "Ofti CAP Fiber Optic Connectors". 2 pages. Jan. 25, 1994.

Primary Examiner—Rodney B. Bovernick
Assistant Examiner—Phan Thi Heartney
Attorney, Agent, or Firm—June B. Schuette

[57] ABSTRACT

A fiber optic connector plug body (1) receives a ferrule (2) therewithin. The plug body (1) receives an internal body (5) in a snap fit to retain the ferrule (2) within the plug body (1). Two inwardly biased latch members (14) on the plug body (1) are received within a circumferential groove on the internal body. The resulting assembly is resistant to disassembly upon application of tensile and lateral forces to the internal body.

6 Claims, 6 Drawing Sheets

CAPTIVATED FIBER OPTIC CONNECTOR

FIELD OF THE INVENTION

This invention relates to the field of fiber optic connectors, and more particularly to epoxyless fiber optic connectors.

BACKGROUND OF THE INVENTION

One style of fiber optic connector is disclosed in U.S. Pat. Nos. 5,018,316 and 5,136,672, and is referred to in the industry as a push-pull type or SC-style connector. When the SC-style connector is in a mated condition, it is resistant to decoupling of the fiber optic connection when a tensile force is applied to a cable that is attached to the connector. The resistance to decoupling under tensile force provides a lower insertion loss fiber optic connector capable of installation in a greater variety of operating environments.

Alignment ferrules receive, retain, and align an optical fiber within a plug body. The plug body fits within a connector housing. Alignment ferrules in known SC-style fiber optic connectors require epoxy to retain the optical fiber within the ferrule. An epoxyless fiber optic ferrule disclosed in U.S. Pat. No. 5,088,804 to Grinderslev is an epoxyless ferrule that uses an elastomeric insert and a plunger that forces the insert into a constriction in the ferrule to retain the fiber. Use of an epoxyless ferrule permits an installer to dispense with epoxy thereby decreasing installation time and required installation equipment. It is beneficial, therefore, to have an epoxyless SC-style fiber optic connector.

In order to minimize installation time and maximize installation ease, a manufacturer assembles the connector to the greatest possible extent prior to shipment and use by an installer. It is most efficient for the installer to handle as few parts as possible during the installation process. Ferrules in fiber optic connectors are typically spring loaded within the connector to assure compressive engagement between two mated ferrules. Epoxyless fiber optic ferrules typically have additional parts in order to obviate the use of epoxy. A preassembled connector of both types, therefore, comprises multiple unattached parts. It is beneficial, therefore, to captivate the multiple parts in a single piece preassembled connector so an installer handles solely a single part for each connector.

It is known that ferrules may be captivated while loosely floating within a plug body, by an internal body that is threaded to the plug body. The preassembly process includes the steps of loading a ferrule and spring into the plug body and threading an internal body to a rear of the plug body. The plug body assembly is retained by the connector housing thereby captivating the various floating parts into a single piece preassembled connector. In the case of the threaded internal body, epoxy is applied to the threads during the preassembly process to assure that the single piece preassembled connector remains intact during shipment and handling. The additional time and handling required to apply epoxy and perform the threading operation is costly. It is beneficial, therefore, to minimize the time to preassemble the connector and to dispense with the use of epoxy.

It is known that a ferrule may be captivated within a connector housing by a body that is snap fit to the housing. Known snap fit connectors, however, will disassemble when a lateral force equal to or exceeding a threshold amount is applied to the snap fit body. It is beneficial, therefore, to have a snap fit captivated internal body that can resist disassembly in response to a threshold, lateral force.

SUMMARY OF THE INVENTION

The invention provides for an epoxyless fiber optic connector plug body with inwardly biased latch members that receive and retain an internal body. The latch members interfere with walls of a recess in the internal body captivating the internal body in a preassembled connector. The retained internal body provides a barrier to resist egress of a ferrule and axial biasing element within the housing as a single piece preassembled connector.

DETAILED DESCRIPTION

Figure 1:
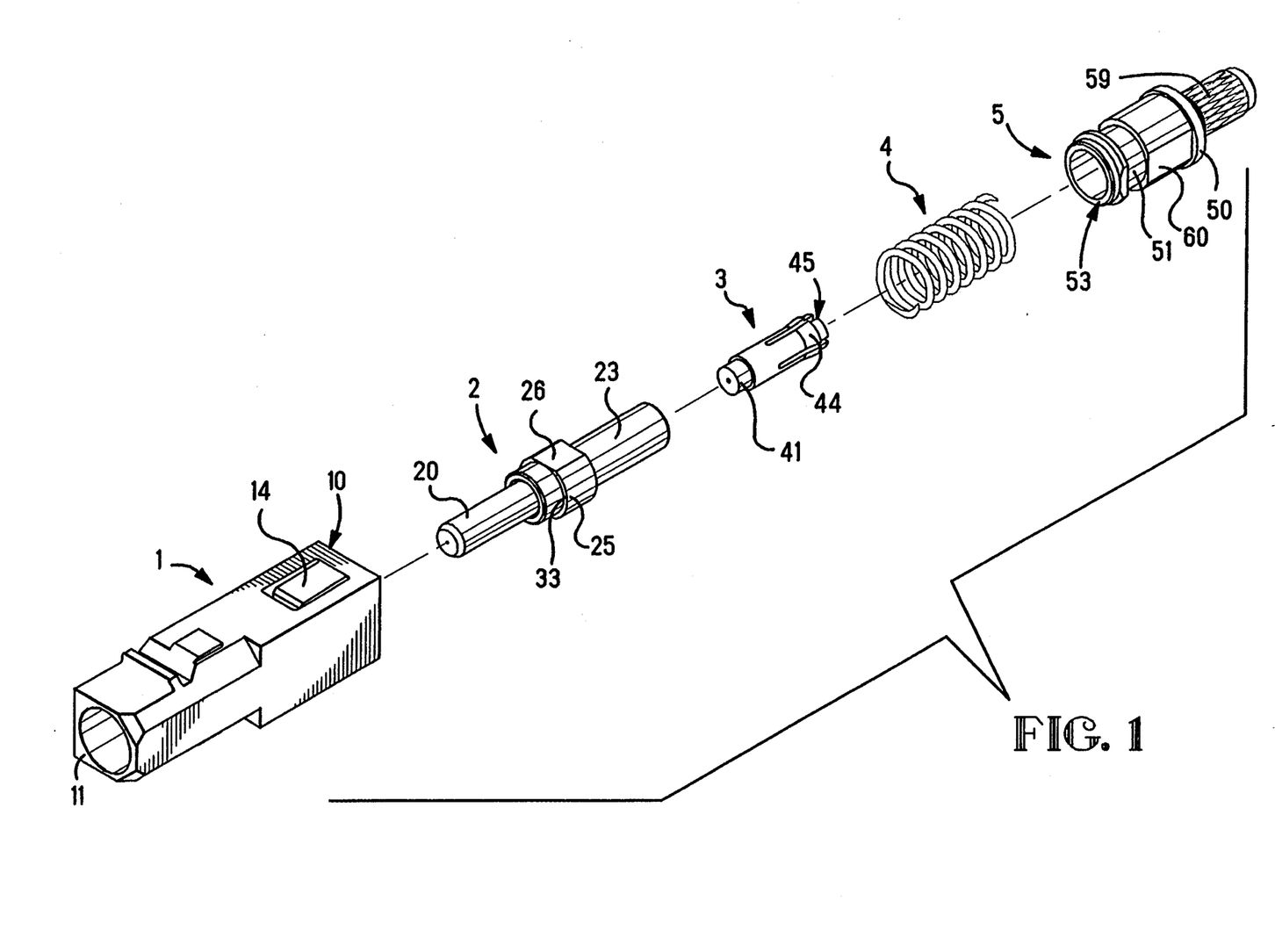
FIG. 1 is a perspective view of a fiber optic connector according to an embodiment of the present invention illustrating a housing, a ferrule and plunger, an axial biasing element, and an internal body.

With more particular reference to the drawings, FIG. 1 shows an embodiment of a connector plug body 1 according to the present invention, an alignment ferrule 2, a plunger 3, an axial biasing element 4, and a internal body 5. A preassembled plug body 1 fits within an SC-style connector housing (not shown) to create a preassembled SC-style connector. The SC-style connector matingly cooperates with an SC-style connector receptacle. The connector housing, the connector receptacle, and the exterior dimensions of the plug body 1 are substantially similar to those disclosed in the U.S. Pat. No. 5,018,316 to Mulholland, et al.

Figure 2:
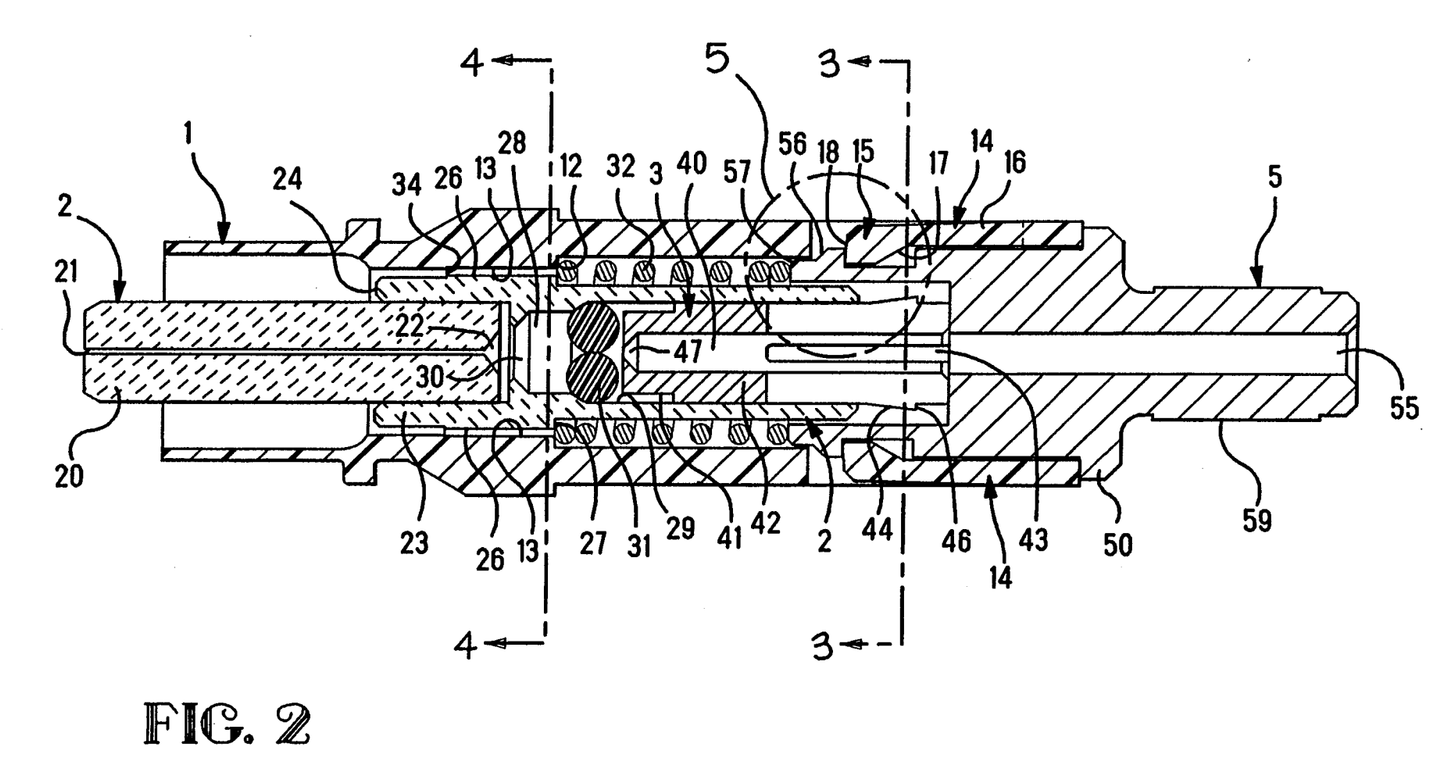
FIG. 2 is a cross sectional view along a longitudinal axis of a preassembled fiber optic connector.

With reference to FIGS. 1 and 2, the plug body 1 is hollow with a rearward nonmating end 10 and a forward mating end 11 that matingly cooperates with an SC-style connector receptacle. Two inwardly biased latch members 14, each having a free end 15 and a fixed end 16, extend along respective openings in the plug body 1, and are integrally molded with the plug body 1. The latch members 14 are spaced apart at 180 degree angles around the plug body 1. Alternative embodiments according to the present invention include for example three latch members spaced at 120 degree intervals around the plug body 1 or four latch members spaced at 90 degree intervals around the plug body 1. The free end 15 has a latch deflector surface 17 that slopes from the free end 15 away from a center of the plug body 1. A transverse latch shoulder 18 on the free end 15 is substantially a right angle on a front side facing near to a center of the plug body 1, and is chamfered at the front on an exterior side facing toward an outside of the plug body 1.

Figure 3:
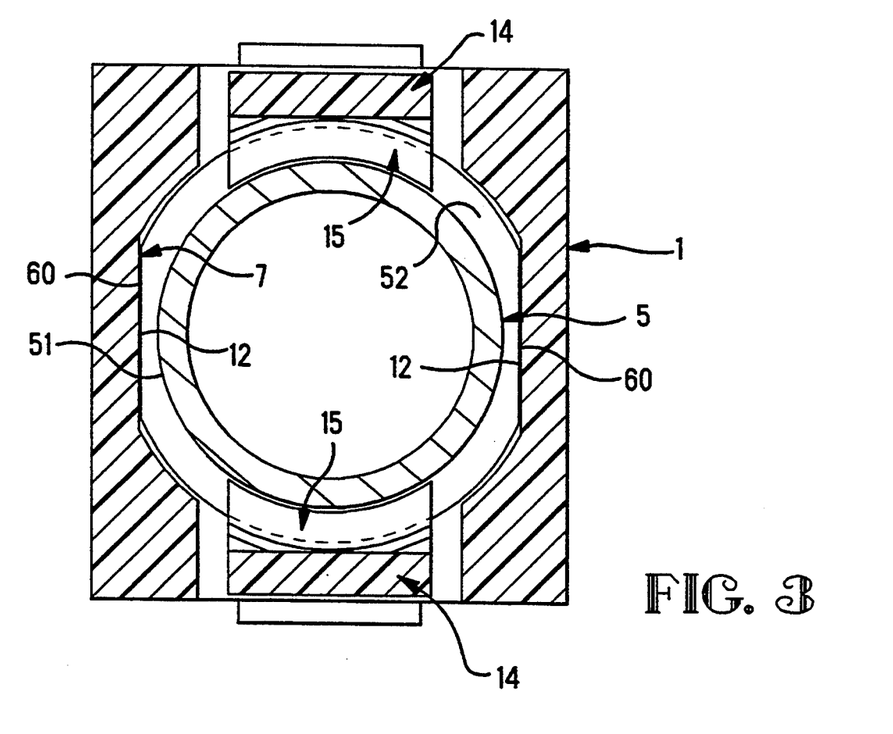
FIG. 3 is a cross sectional view along axis labeled 3—3 in FIG. 2 orthogonal to the longitudinal axis.
Figure 4:
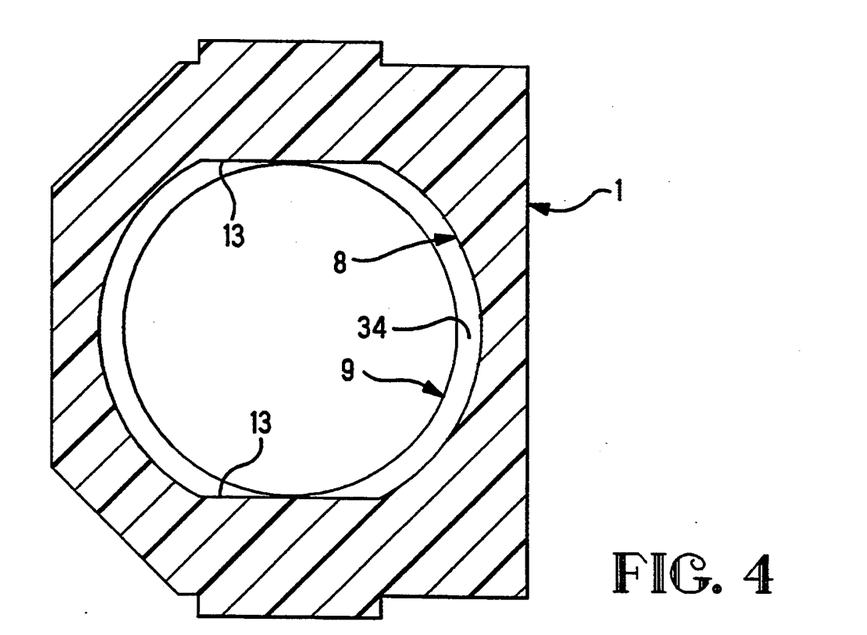
FIG. 4 is a cross sectional view along axis labeled 4—4 in FIG. 2 orthogonal to the longitudinal axis.

With reference to FIG. 3, a rearward inner, cylindrical circumference 7 of the plug body 1 rearward of the free end 15 is intersected by two rearward chords 12. An inner contour of the free end 15 of each of the latch members 14 is of partial cylindrical shape projecting radially within the rearward inner circumference 7. With reference to FIG. 4 a forward inner circumference 8 is intersected by two forward chords 13. A circular, diametric retention abutment 34 forms an abrupt transition between the circumference 8 and a smaller diameter, retention circumference 9.

In an epoxyless ferrule embodiment according to an embodiment of the present invention, the alignment ferrule 2 is substantially similar to that disclosed in the U.S. Pat. No. 5,088,804 to Grinderslev. The present invention may also be used with versions of alignment ferrules that require epoxy. With reference to FIG. 1 and 2, in an epoxyless ferrule embodiment according to the present invention, the alignment ferrule 2 comprises a ceramic precision ferrule tip 20 having a fiber passage 21 therethrough and a tapered fiber guide 22 at a rear of the ferrule tip 20. The rear of the ferrule tip 20 is partially contained within an aluminum ferrule body 23. Alternatively, the ferrule 2 may be made of different materials, such as the overmolded ferrule disclosed in U S. patent application Ser. No. 08/066,849 now issued. An outside diameter of the ferrule body 23 is larger relative to an outside diameter of the ferrule tip 20. The ferrule 2 has a circumferential ferrule rim 24 at the transition between the ferrule tip 20 and the ferrule body 23. With reference to FIG. 1 and 4, an enlarged collar 25 on the ferrule body 23 is substantially cylindrical with two opposing exterior ferrule flats 26. The ferrule flats 26 overlap and cooperate with the forward chords 13 (shown in FIG. 4) to resist rotation of the ferrule 2 relative to the plug body 1. A forward facing transverse retention face 33 on the collar 25 is intersected by the slots 26. The retention face 33 opposes and abuts the retention abutment 34 (FIG. 4) to resist forward egress of the ferrule 2 relative the plug body 1. With reference to FIG. 2, the collar 25 has a rearward facing transverse biasing face 27. The ferrule body 23 has a forward plunger passage 28 and a rearward plunger passage 29, both are coaxial with the fiber passage 21. The forward plunger passage 28 has a smaller inner diameter than the rearward plunger passage 29. The forward and rearward plunger passages 28, 29 have diameters sufficient to receive the plunger 3 therewithin. There is a tapered constriction 30 at a forward end of the forward plunger passage 28 and rearward of the ferrule tip 20. The constriction 30 is a tapered channel of progressively narrower inner diameter. An elastomeric insert 31 occupies the forward plunger passage 28 rearward of the constriction 30. The insert 31 consists of three similarly sized elastomeric spheres. Alternatively, differently shaped elastomeric inserts may be used such as those disclosed in U.S. Pat. No. 5,088,804. The plunger 3 occupies the forward plunger passage 28 rearward of the insert 31 with a friction fit, thereby captivating the insert 31 within the forward plunger passage 19.

A spring 32 comprises as the axial biasing element 4 to bias the ferrule 2 toward the mating end 10 of the plug body 1. The rearward facing biasing face 27 resists forward movement of the spring 32 beyond the collar 25. The retention face 33 abuts the retention abutment 34 thereby resisting movement of the collar 25 forward and beyond the retention abutment 34.

With reference to FIG. 2, the plunger 3 has a central plunger buffer passage 40 extending therethrough coaxial and continuous with the fiber passage 21. A forward plunger section 41 is adapted with a sufficiently sized outer diameter to press fit into the forward plunger passage 28. A rearward plunger section 42 is of larger outer diameter that the forward plunger section 41. The rearward plunger section 42 has four parallel lengthwise slits 43 spaced 90 degrees apart defining four tines 44 of a collet 45 (shown in FIG. 1). Inclined barbs 46 on the tines 44 create a diametrically enlarged rearward plunger section 42. In the preassembled connector, the collet 45 is in an uncollapsed state and the rearward plunger section 42 is of larger outer diameter than the rearward plunger passage 29. A tapered buffer/fiber transition section 47 is at a forward end of the plunger buffer passage 40.

With reference to FIGS. 1 and 2, the plug body 1 receives the internal body 5 therewithin in a snap fit. An exterior flange 50 on the internal body 5 has a diameter larger than the inner diameter of the plug body 1 preventing further ingress of the internal body 5 relative the plug body 1. A grip 59 rearward of the flange 50 is knurled. The internal body 5 has a body buffer passage 55 therethrough that is coaxial and continuous with the buffer passage 40 and the fiber passage 21 which are open one into another. The internal body 5 has exterior body flats 60 that overlap and cooperate with the rearward chords 12 to resist rotation of the internal body 5 relative the plug body 1.

Figure 5:
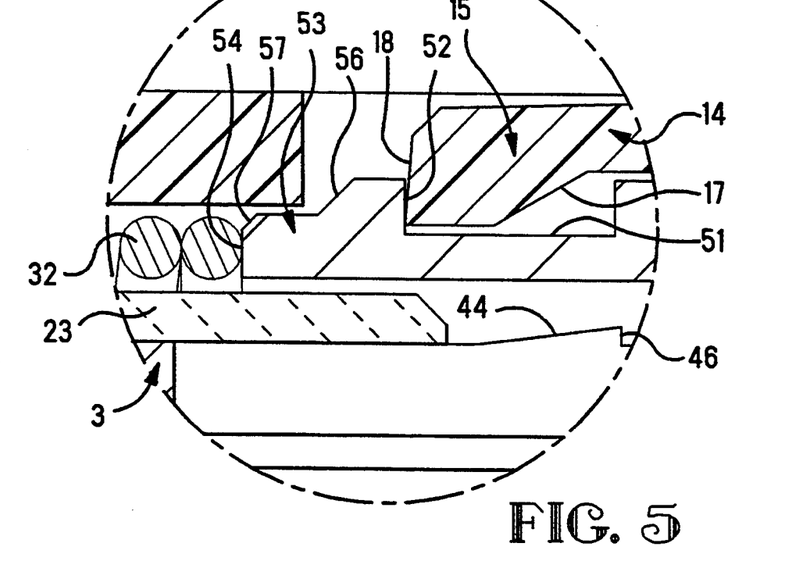
FIG. 5 is an enlarged cross sectional view illustrating the cooperation of the latch members and the internal body in the preassembled connector shown in FIG. 2.

With reference to FIGS. 1 and 5, a circumferential recess 51 in an outer diameter of the internal body 5 forward of the flange 50 has a substantially rectilinear cross section. A width of the recess 51, bounded between its front end and rear walls, is sufficiently dimensioned to receive the free end 15 and latch deflector surface 17 of the latch members 14. The latch shoulder 18 interferes with a rear facing forward recess wall 52 to resist egress of the internal body 5 relative the plug body 1. A substantially tubular forward body section 53 is received within an inner diameter of the plug body 1 forward of the free end 15 of the latch members 14. A transverse reaction face 54 on the front of the forward body section 53 abuts the spring 32. Encirclement of the forward body section 53 by the plug body 1 is of sufficient depth of receipt to restrain lateral deflection of the body section relative to the plug body 1, and limits the maximum possible deflection of the latch members 14 by the internal body 5 acting as a lever in response to lateral forces applied to the grip 59. The maximum possible deflection of the internal body 5 as limited by containment of the forward body section 53 in the plug body 1 is insufficient to deflect the latch members 14 out of the recess 51, and cause disassembly of the internal body 5 and the plug body 1.

A preassembly process that results in the preassembled connector, such as the embodiment shown in cross section in FIG. 2, comprises the steps of; assembling the ferrule 2 with the insert 31 and plunger 3, placing the spring 32 concentrically onto the ferrule 2, supplying the plug body 1, placing an assembly of the ferrule/spring 2/33 into the plug body 1, and fitting the internal body 5 within the plug body 1 until the latch members 14 are received within the recess 51. As the internal body 5 enters the plug body 1, a forward body deflector surface 56 engages and lifts each rearward inclined latch deflector surface 17 deflecting the latch members 14 radially outward. The forward body deflector surface 56 is inclined from front to rear at a preferred angle of 45 degrees, permitting smooth and continuous deflection forces on the latch members 14 as the internal body is inserted into the plug body 1. A tapered lead-in 57 on the forward body section 53 facilitates entry of the internal body within the plug body 1 in an area forward of the latch members 14 during the preassembly process. Appropriate angles of the lead-in 57 and the body deflector surface 56 are sufficient to lower resistance to insertion and are needed to achieve miniaturization of the assembled connector. Preassembly is complete when the latch members 14 are lodged within the recess 51 in an undeflected state.

Figure 7:
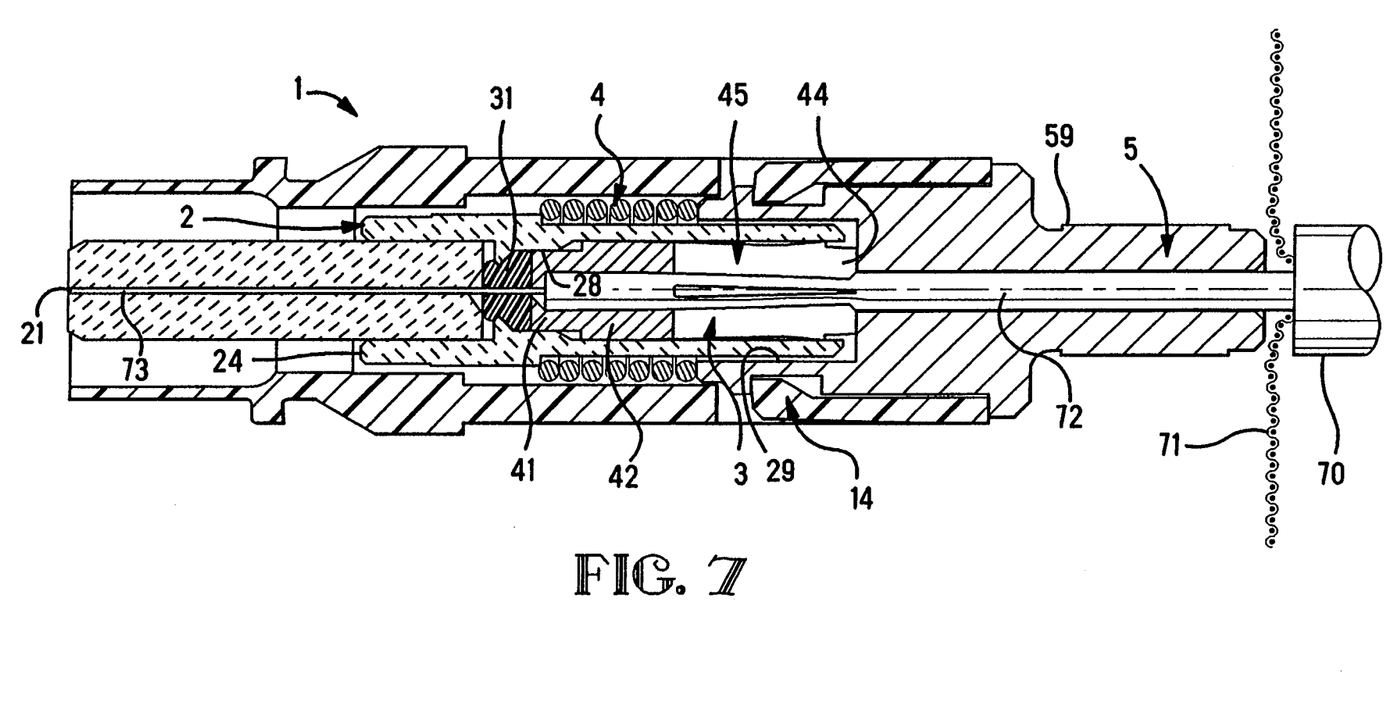
FIG. 7 is a cross sectional view along a longitudinal axis with the plunger fully seated during the axial crimping stage of connector installation.
Figure 8:
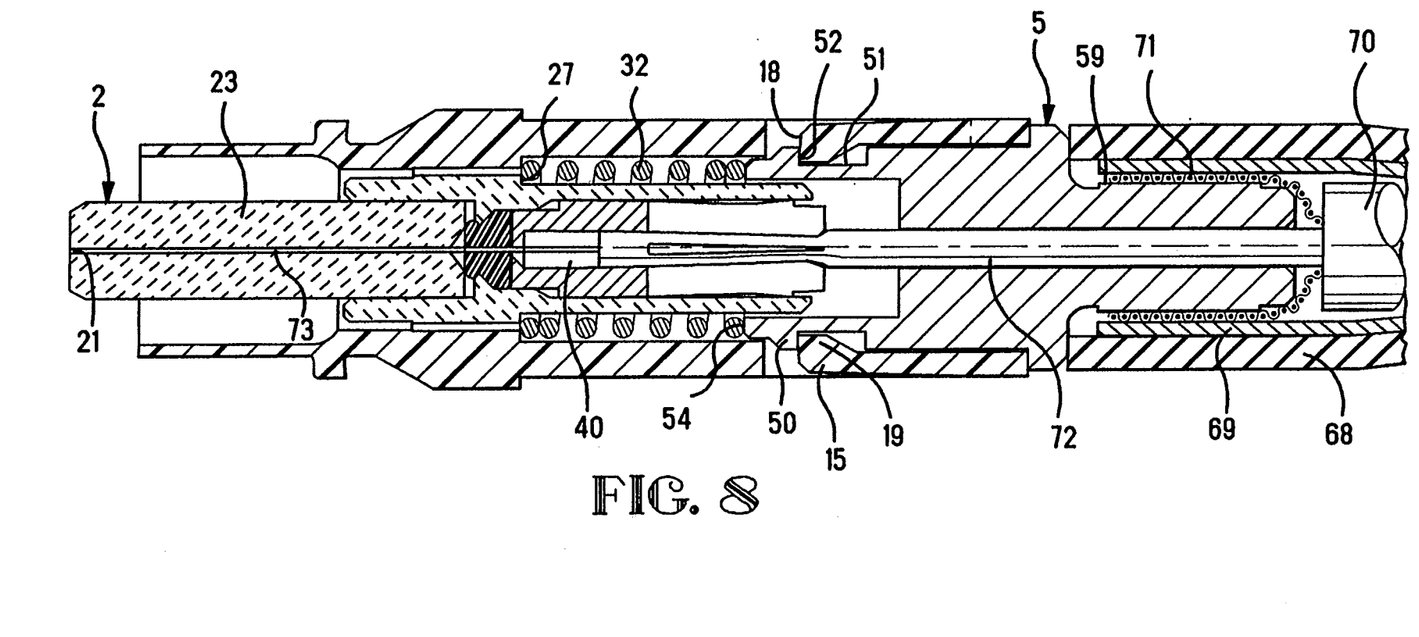
FIG. 8 is a cross sectional view of an installed fiber optic connector.

With more particular reference to FIGS. 7 and 8, installation of the connector comprises the steps of; threading a strain relief boot 68 and an eyelet 69 concentrically over a fiber optic cable 70, stripping the optical fiber cable 70 to expose strength members 71, buffer 72, and fiber 73, each for a certain length, inserting the stripped cable 70 into the preassembled connector such that the fiber 73 is received within the fiber passage 21, the buffer 72 is received within the buffer passage 40, and the strength menders 71 are on an outside of the grip 59, axial crimping the preassembled connector to the fiber 72, and completing the assembly using methods well known in the industry comprising: cleaving and polishing the end of the terminated fiber 73 to the desired finish, radial crimping the eyelet 69 over the grip 59 to secure the strength members 71 to the internal body 5, and positioning the strain relief boot 68 over the eyelet 69.

The axial crimping process is accomplished by applying a compressive force along the longitudinal axis and against opposite ends of the ferrule rim 24 and the internal body 5. The compressive force causes the ferrule rim 24 and the internal body 5 to move relatively toward each other. As the ferrule rim 24 moves toward the internal body 5, the internal body 5 acts as a reaction surface forcing entry of the plunger 3 into the ferrule 2. As the forward plunger section 41 enters the forward plunger passage 28, the forward plunger section 41 urges the insert 31 into the constriction 30 thereby compressing the insert 31. The forward plunger section 41 fits within the forward plunger passage 28 in a press fit. Compression of the insert 31 causes the insert to engage, grip and retain the fiber 73. As the rearward plunger section 42 enters the rearward plunger passage 29, the tines 44 of the collet 45 collapse radially upon the buffer 72, gripping and retaining the buffer 72. Proper compression forces exerted on the preassembled connector to perform the axial crimp should not exceed 140 lbs. The tool, not shown, crimps the preassembled connector to a fixed length to achieve the proper compression of the elastomeric insert 31. The latch members 14, therefore, do not experience any force during the axial crimp process.

With more particular reference to FIG. 8, in an installed connector the spring 32 surrounds the ferrule 2 on a circumferential periphery of the ferrule body 23. The spring 32, in the installed connector, uses the reaction face 54 as a reaction surface to exert an axial force on the biasing face 27. The spring 32 axially biases the ferrule 2 forward when the installed connector is in a mated condition to assure compressive contact between two mated fiber optic connectors.

Figure 6:
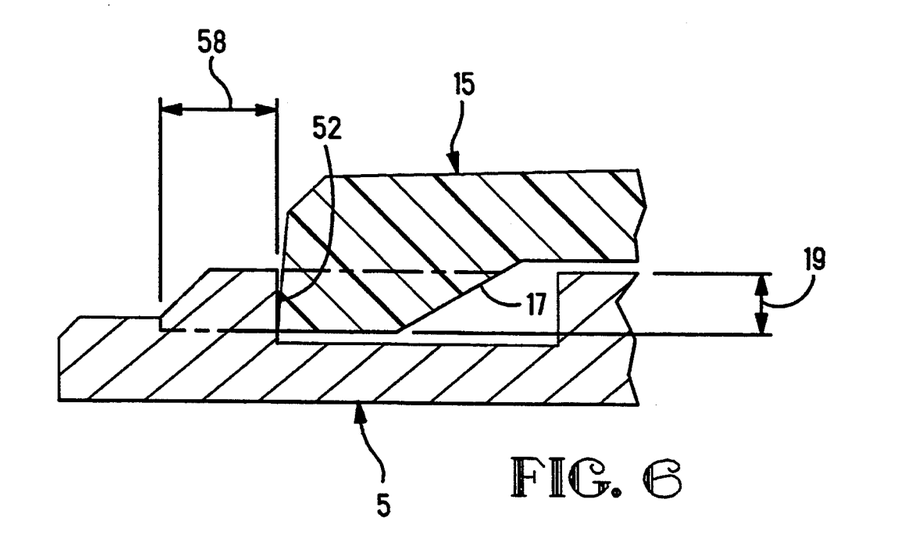
FIG. 6 is an enlarged cross sectional view of a latch member in relationship to the recess in the internal body.

One benefit of the SC-style connector is its resistance to decoupling of the optical connection in the presence of tensile forces up to a threshold of at least 25 lbs. The plug body 1 together in latched combination with the internal body 5, are able to withstand tensile forces of at least the same magnitude without disassembling. The strength members 71 are attached to the internal body 5 of an installed connector. The forward rear facing wall 52 in the recess 51 of the internal body 5 impinges the latch shoulder 18 in response to tensile forces applied on the fiber optic cable 70. With reference to FIG. 6, an interference mass indicated by 58 on the internal body 5 engages a shear mass indicated by 19 on the free end 15, both of which are massive to resist egress of the internal body 5 relative the plug body 1. Competing design considerations quantify an appropriate angle for the latch deflector surface 17. The angle is sufficiently small to provide a shear surface with sufficient magnitude to withstand forces exerted on the free end 15 when a tensile force is applied to the internal body 5 via the cable 70 of an assembled connector. The angle is sufficiently large to achieve optimum miniaturization of the assembled connector.

Other advantages of the present invention are apparent by way of example in the detailed description, the accompanying drawings, and from the spirit and scope of the appended claims.

We claim:
1. A preassembled fiber optic connector comprising:
   (a) a hollow plug body (1) having at least two inwardly biased latch members (14), a mating end (11), and a nonmating end (10),
   (b) a fiber alignment ferrule (2) within said plug body,
   (c) an axial biasing element (4) within said plug body urging said ferrule toward said mating end, and
   (d) an internal body (5) rearward of said axial biasing element and said ferrule, said internal body captivating said ferrule and said axial biasing element within said plug body, said internal body having a recess (51) bounded by walls (52), wherein said recess receives said latch members and said walls of said recess interfere with said latch members to retain said internal body within said plug body.

2. A fiber optic connector as recited in claim 1 wherein, said internal body has a forward body section (53) contained by said plug body forward of said latch members to resist deflection of said latch members in response to lateral forces applied to said internal body.

3. A fiber optic connector as recited in claim 1 wherein, said latch members have an inner diameter that follows a cylindrical contour.

4. A fiber optic connector as recited in claim 1 wherein, said latch members and said plug body are integrally molded.

5. A fiber optic connector as recited in claim 1 wherein, said recess is a circumferential groove in said internal body.

6. A terminated fiber optic connector comprising:
   (a) a hollow plug body having at least two inwardly biased latch members, a mating end, and a nonmating end,
   (b) a fiber alignment ferrule within said plug body, said ferrule having a central fiber passage therethrough,
   (c) an optical fiber retained within said fiber passage (d) an axial biasing element within said plug body urging said ferrule toward said mating end, and
(e) an internal body rearward of said axial biasing element and said ferrule, said internal body providing a reaction face for said axial biasing element as it urges said ferrule toward said mating end, said internal body having a recess bounded by walls that receives said latch members wherein said walls of said recess interfere with said latch members to retain said internal body within said plug body.

* * * * *